(12) United States Patent
Sakai

(10) Patent No.: US 9,258,448 B2
(45) Date of Patent: Feb. 9, 2016

(54) OVERHEAD SCANNER, IMAGE OBTAINING METHOD, AND COMPUTER-READABLE RECORDING MEDIUM

(71) Applicant: PFU Limited, Kahoku-shi, Ishikawa (JP)

(72) Inventor: Masayuki Sakai, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 58 days.

(21) Appl. No.: 14/192,491

(22) Filed: Feb. 27, 2014

(65) Prior Publication Data

US 2014/0240799 A1     Aug. 28, 2014

(30) Foreign Application Priority Data

Feb. 28, 2013 (JP) ................ 2013-039520

(51) Int. Cl.
*H04N 1/04* (2006.01)
*H04N 1/047* (2006.01)
*H04N 1/00* (2006.01)
*H04N 1/195* (2006.01)

(52) U.S. Cl.
CPC .......... *H04N 1/047* (2013.01); *H04N 1/00381* (2013.01); *H04N 1/19594* (2013.01)

(58) Field of Classification Search
CPC  H04N 1/047; H04N 1/00381; H04N 1/19594
USPC ................. 358/488, 473, 497, 494
See application file for complete search history.

(56) References Cited

U.S. PATENT DOCUMENTS

| 8,503,045 | B2 | 8/2013 | Kubo et al. | |
| 9,019,572 | B2* | 4/2015 | Hasegawa | 358/474 |
| 2007/0292026 | A1* | 12/2007 | Reznik et al. | 382/176 |

FOREIGN PATENT DOCUMENTS

| JP | 2003-244531 A | 8/2003 |
| JP | 2011-254366 A | 12/2011 |

* cited by examiner

*Primary Examiner* — Houshang Safaipour
(74) *Attorney, Agent, or Firm* — McDermott Will & Emery LLP

(57) ABSTRACT

An overhead scanner successively obtains a plurality of images by controlling an area sensor, calculates a movement pattern by image difference extraction by using the obtained images, detects a page turning movement on the basis of the movement pattern, and determines that a read operation be started when the page turning movement is detected.

20 Claims, 14 Drawing Sheets

ROTATION DIRECTION
140
LINE LIGHT
READING RANGE

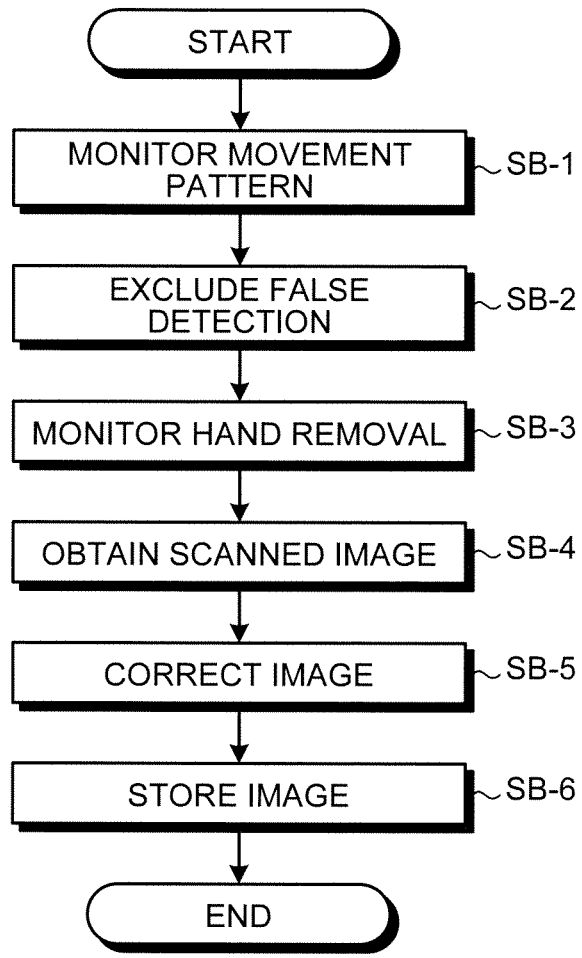

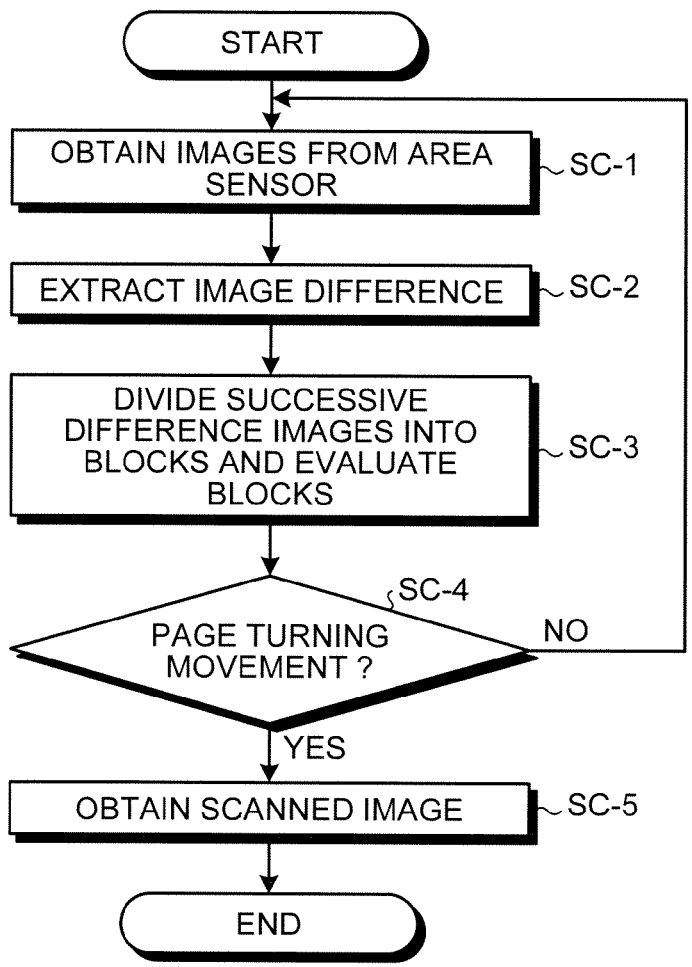
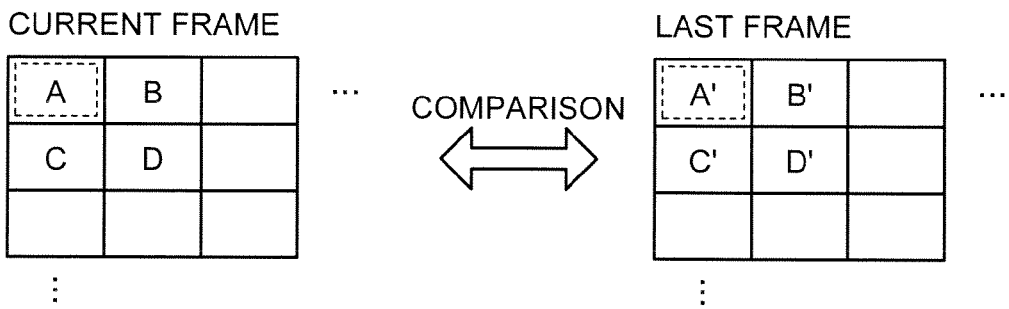

OVERHEAD SCANNER, IMAGE OBTAINING METHOD, AND COMPUTER-READABLE RECORDING MEDIUM

CROSS-REFERENCE TO RELATED APPLICATION

This application is based upon and claims the benefit of priority from Japanese Patent Application No. 2013-039520, filed Feb. 28, 2013, the entire contents of which are incorporated herein by reference.

BACKGROUND OF THE INVENTION

1. Field of the Invention

The present invention relates to an overhead scanner, an image obtaining method, and a computer-readable recording medium.

2. Description of the Related Art

Conventional overhead scanners that improve operability have been developed.

In order to provide excellent operability when reading documents and to obtain high-definition images, there is an overhead scanner that determines that a read operation is started on the basis of velocity vectors obtained by extracting feature points (see Japanese Patent Application Laid-open No. 2011-254366).

Moreover, there is a scanner that, when a scanned image is formed by correcting a frame of a moving image captured by a high-speed area sensor, successively monitors a projected light pattern reflected from an object, detects a change within an area region by extracting a difference, and detects a change in an object by comparing the detection results (see Japanese Patent Application Laid-open No. 2003-244531).

However, there is a problem with conventional scanners that they easily produce a false detection, i.e., the detection of a movement other than a predetermined movement, and therefore the accuracy with which a predetermined movement is correctly detected is low.

The present invention is achieved in view of the above and has an object to provide an overhead scanner, an image obtaining method, and a computer-readable recording medium capable of preventing a false detection and detecting the start of a read operation with high accuracy.

SUMMARY OF THE INVENTION

According to an aspect of the present invention, an overhead scanner includes an area sensor; and a control unit, wherein the control unit includes an area-image obtaining unit that successively obtains a plurality of images by controlling the area sensor, a movement-pattern calculating unit that calculates a movement pattern by image difference extraction by using the images obtained by the area-image obtaining unit, a movement detecting unit that detects a page turning movement on a basis of the movement pattern calculated by the movement-pattern calculating unit, and a read-start determining unit that determines that a read operation be started when the page turning movement is detected by the movement detecting unit.

According to another aspect of the present invention, an image obtaining method includes an area-image obtaining step of successively obtaining a plurality of images by controlling an area sensor; a movement-pattern calculating step of calculating a movement pattern by image difference extraction by using the images obtained in the area-image obtaining step; a movement detecting step of detecting a page turning movement on a basis of the movement pattern calculated in the movement-pattern calculating step; and a read-start determining step of determining that a read operation be started when the page turning movement is detected in the movement detecting step, wherein the area-image obtaining step, the movement-pattern calculating step, the movement detecting step, and the read-start determining step are executed by a control unit of an overhead scanner that includes the area sensor and the control unit.

According to still another aspect of the present invention, a non-transitory computer-readable recording medium that stores therein a program that causes a control unit of an overhead scanner including an area sensor and the control unit to execute: an area-image obtaining step of successively obtaining a plurality of images by controlling the area sensor; a movement-pattern calculating step of calculating a movement pattern by image difference extraction by using the images obtained in the area-image obtaining step; a movement detecting step of detecting a page turning movement on a basis of the movement pattern calculated in the movement-pattern calculating step; and a read-start determining step of determining that a read operation be started when the page turning movement is detected in the movement detecting step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart illustrating an example of the embodying process performed by the overhead scanner in the present embodiment;

FIG. 8 is a flowchart representing a subroutine of a movement-pattern monitoring process;

FIG. 9 is a diagram schematically illustrating a method of comparing the gradation at each pixel of an image of the current frame (N) and an image of the last frame (N−1);

DETAILED DESCRIPTION OF THE PREFERRED EMBODIMENTS

Exemplary embodiments of an overhead scanner, an image obtaining method, and a computer-readable recording medium according to the present invention will be explained below in detail with reference to the accompanying drawings. The present invention is not limited to the embodiments. Specially, although a document of a book or the like is sometimes described as an object to be read in the present embodiment, the present invention is not to be thus limited, but a stapled medium, a stack of single-cut sheets, and the like may be used as an object to be read.

1. Configuration of Present Embodiment

Figure 1:
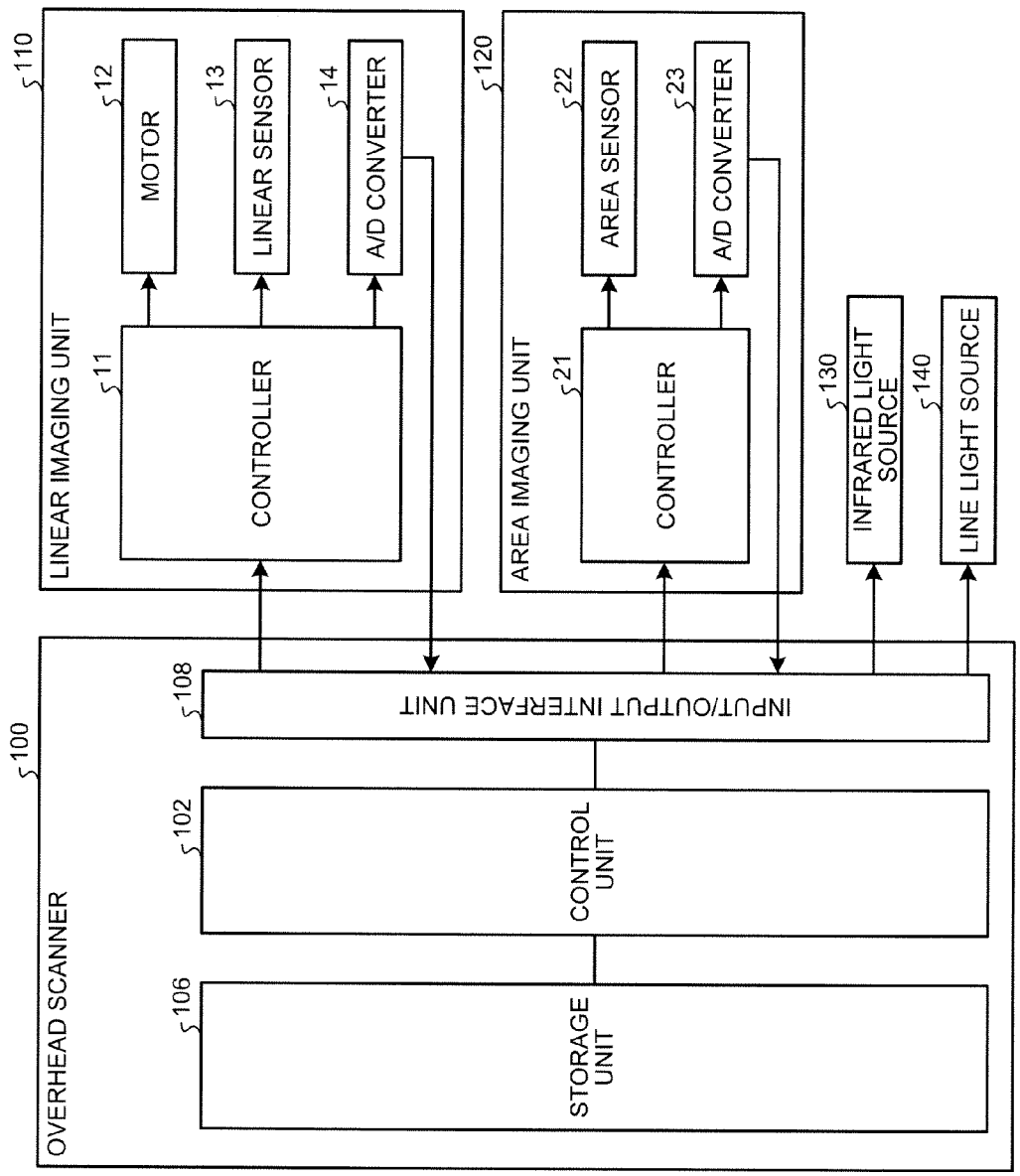
FIG. 1 is a hardware configuration diagram illustrating an example of an overhead scanner.

The configuration of an overhead scanner 100 according to the present embodiment will be explained with reference to FIG. 1. FIG. 1 is a hardware configuration diagram illustrating an example of the overhead scanner 100.

As illustrated in FIG. 1, the overhead scanner 100 includes at least a linear imaging unit 110, an area imaging unit 120, and a control unit 102. In the present embodiment, the overhead scanner 100 further includes a storage unit 106, an input/output interface unit 108, an infrared light source 130, and a line light source 140. These units are communicatively connected to one another via an arbitrary communication channel.

Figure 2:
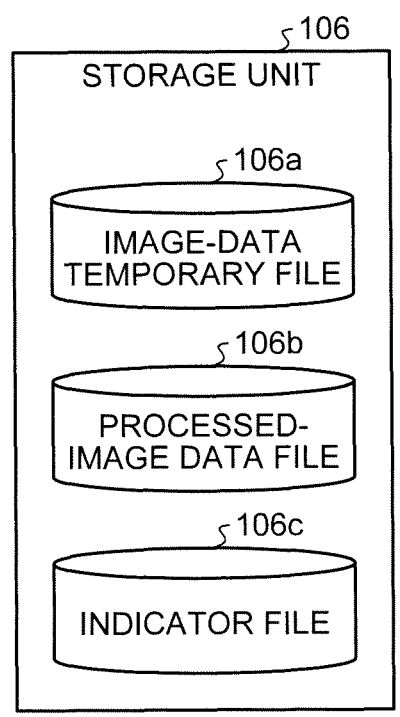
FIG. 2 is a block diagram illustrating an example of a storage unit of the overhead scanner.

The storage unit 106 stores therein various databases, tables, files, and the like. The storage unit 106 is a storage unit. For example, a memory device, such as a RAM and a ROM, a fixed disk drive, such as a hard disk, a flexible disk, an optical disk, or the like can be used as the storage unit 106. The storage unit 106 records therein computer programs for providing instructions to a CPU (Central Processing Unit) and executing various processes. FIG. 2 is a block diagram illustrating an example of the storage unit 106 of the overhead scanner 100.

As illustrated in FIG. 2, the storage unit 106 includes an image-data temporary file 106a, a processed-image data file 106b, and an indicator file 106c.

Among them, the image-data temporary file 106a temporarily stores therein image data read by the linear imaging unit 110 or the area imaging unit 120.

The processed-image data file 106b stores therein processed or edited image data from image data read by the linear imaging unit 110.

The indicator file 106c is an indicator storage unit that stores therein color, shape, and the like of an indicator, such as a hand and a finger, provided by a user. The indicator file 106c may store therein color (skin color), shape, and the like of a users' hand or finger for each user.

The input/output interface unit 108 connects the linear imaging unit 110, the area imaging unit 120, the infrared light source 130, and the line light source 140 to the control unit 102. A halogen light source can be used as the infrared light source 130. The line light source 140 may be an LED light source, a laser light source, or the like, and it emits light onto the area to be read.

Figure 3:
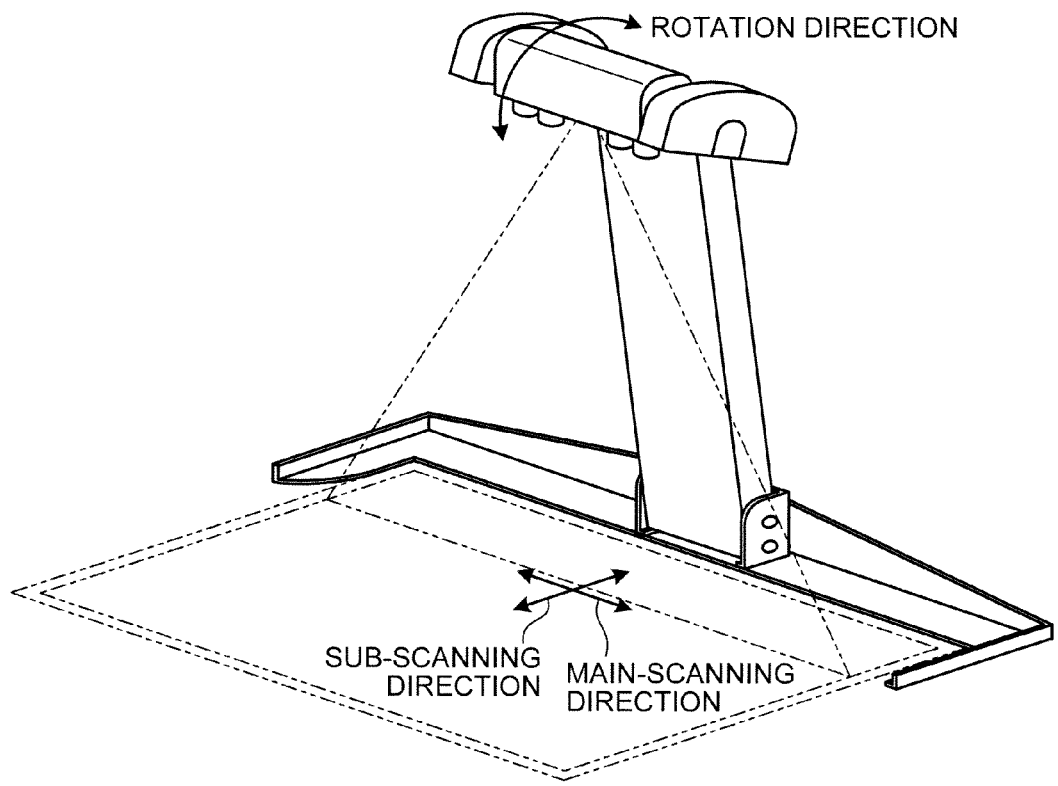
FIG. 3 illustrates an example of the appearance of the apparatus in which a linear imaging unit and an area imaging unit are integrated and is a diagram illustrating the relationship between the main-scanning direction, the sub-scanning direction, and the rotation direction controlled by a motor.

The linear imaging unit 110 scans a document placed face-up from above in order to read an image on the document by using a linear sensor 13. In the present embodiment, as illustrated in FIG. 1, the linear imaging unit 110 includes a controller 11, a motor 12, the linear sensor (line sensor) 13, and an A/D converter 14. The controller 11 controls the motor 12, the linear sensor 13, and the A/D converter 14 in accordance with instructions from the control unit 102 via the input/output interface unit 108. The linear sensor 13 photoelectrically converts light that reaches it from a line in the main-scanning direction of a document into an analog charge quantity for each pixel on the line. Then, the A/D converter 14 converts the analog charge quantity output from the linear sensor 13 into a digital signal and outputs one-dimensional image data. When the motor 12 is driven to rotate, a document line targeted for reading by the linear sensor 13 shifts in the sub-scanning direction. Accordingly, one-dimensional image data for each line is output from the A/D converter 14 and the control unit 102 generates two-dimensional image data by combining a plurality of pieces of one-dimensional image data. FIG. 3 illustrates an example of the appearance of the apparatus in which the linear imaging unit 110 and the area imaging unit 120 are integrated and is a diagram illustrating the relationship between the main-scanning direction, the sub-scanning direction, and the rotation direction controlled by the motor 12.

As illustrated in FIG. 3, when a document is placed face-up and is imaged from above by the linear imaging unit 110, one-dimensional image data of a line in the main-scanning direction illustrated in FIG. 3 is read by the linear sensor 13. Then, when the linear sensor 13 is caused to rotate in the rotation direction in FIG. 3 by driving the motor 12, the line to be read by the linear sensor 13 shifts in the sub-scanning direction in FIG. 3 in accordance with the rotation. Accordingly, two-dimensional image data of the document is read by the linear imaging unit 110.

Here, the description refers back to FIG. 1. The area imaging unit 120 scans a document placed face-up from above in order to read an image on the document by using an area sensor 22. In the present embodiment, as illustrated in FIG. 1, the area imaging unit 120 includes a controller 21, the area sensor 22, and an A/D converter 23. The controller 21 controls the area sensor 22 and the A/D converter 23 in accordance with instructions from the control unit 102 via the input/output interface unit 108. The area sensor 22 photoelectrically converts light that reaches it from the document face (which is a two-dimensional plane with one dimension in the main-scanning direction and the other in the sub-scanning direction illustrated in FIG. 3) into an analog charge quantity for each pixel. Then, the A/D converter 23 converts the analog charge quantity output from the area sensor 22 into a digital signal and outputs two-dimensional image data. Accordingly, two-dimensional image data is output from the A/D converter 23. In the present embodiment, because the linear sensor 13 can read a large number of pixels in one line compared with the area sensor 22, an image read by the linear imaging unit 110 has higher definition (higher resolution) than an image read by the area imaging unit 120. Hereinafter, in order to distinguish between them, in some cases, an image read by the area imaging unit 120 is referred to as an "area image" and an image read by the linear imaging unit 110 is referred to as a "linear image".

Figure 4:
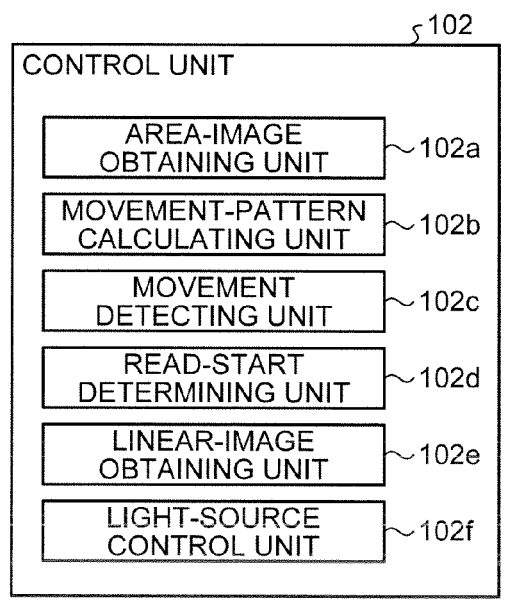
FIG. 4 is a functional block diagram illustrating an example of a control unit of the overhead scanner.

The control unit 102 consists of a CPU or the like that performs overall control of the overhead scanner 100. The control unit 102 includes an internal memory for storing a control program, programs defining various processing procedures and the like, and required data. The control unit 102 performs information processing for executing various processes in accordance with these programs. FIG. 4 is a functional block diagram illustrating an example of the control unit 102 of the overhead scanner 100.

As illustrated in FIG. 4, the control unit 102 roughly includes an area-image obtaining unit 102a, a movement-pattern calculating unit 102b, a movement detecting unit 102c, a read-start determining unit 102d, a linear-image obtaining unit 102e, and a light-source control unit 102f.

The area-image obtaining unit 102a successively obtains a plurality of area images by controlling the area imaging unit 120. For example, as described above, the area-image obtaining unit 102a repeats a process of obtaining image data by the area sensor 22 performing photoelectrical conversion and the A/D converter 23 performing A/D conversion by controlling the controller 21 of the area imaging unit 120 and then storing the image data in an image-data temporary file (buffer) 106a. In other words, the area-image obtaining unit 102a has a function of monitoring document page turning, the movement of a user's hand, and the like by capturing motions with the area sensor 22 and obtaining successive images (moving image). In the present embodiment, the area-image obtaining unit 102a can obtain infrared images by infrared irradiation from the infrared light source 130.

The movement-pattern calculating unit 102b calculates a movement pattern by performing image difference extraction by using a plurality of images obtained by the area-image obtaining unit 102a. Specifically, the movement-pattern calculating unit 102b performs image difference extraction by using the image data of a plurality of area images that are stored in the image-data temporary file 106a by the area-image obtaining unit 102a. For example, the movement-pattern calculating unit 102b extracts a region where there is a difference between the last (time t−1) area image, which is obtained and stored in the image-data temporary file 106a by the area-image obtaining unit 102a, and a newly obtained current (time t) area image. The movement-pattern calculating unit 102b may calculate a movement pattern by a well-known image difference extraction method. The movement-pattern calculating unit 102b may calculate a movement pattern by dividing an image region into a predetermined number of blocks. When an image region is divided into an arbitrary number of blocks, if the number of changed pixels in one block is equal to or greater than a predetermined number, the movement-pattern calculating unit 102b may evaluate the block as a changed block. The movement-pattern calculating unit 102b may divide an image region into an arbitrary number of blocks and, for example, the movement-pattern calculating unit 102b may divide an image region corresponding to the initial movement of a page turning movement into smaller blocks. The image difference extraction method in the present embodiment will be described in detail later with reference to the drawings.

The movement detecting unit 102c detects a page turning movement on the basis of a movement pattern calculated by the movement-pattern calculating unit 102b. The movement detecting unit 102c may screen out false-positive patterns other than a page turning movement and exclude the detection. As an example, if a movement pattern corresponds to at least one of (1) a case where a movement is detected in all regions, (2) a case where a specific region did not move, and (3) a case where a movement is detected at a point that does not move during a page turning movement, the movement detecting unit 102c may exclude the detection as a false-positive pattern.

The movement detecting unit 102c may divide an image region corresponding to the initial movement of a page turning movement into smaller blocks, and, when a block corresponding to the initial movement of a page turning movement changes, the movement detecting unit 102c may determine that a page turning movement has been performed.

When a page turning movement is detected by the movement detecting unit 102c, the read-start determining unit 102d determines that a read operation be started. The read-start determining unit 102d may determine that a read operation be started on the condition that the movement based on the movement pattern calculated by performing image difference extraction by the movement-pattern calculating unit 102b has stopped. The read-start determining unit 102d may manage the power supply of the linear sensor 13 to save power. For example, when the read-start determining unit 102d determines that a read operation by the linear sensor 13 be started, the read-start determining unit 102d may activate the circuit of the linear sensor 13, and, when the read-start determining unit 102d does not determine that a read operation by the linear sensor 13 be started, the read-start determining unit 102d may stop the circuit of the linear sensor 13.

When the read-start determining unit 102d determines that a read operation be started, the linear-image obtaining unit 102e obtains linear images from the linear sensor 13 by controlling the linear imaging unit 110. For example, as described above, the linear-image obtaining unit 102e drives the motor 12 to rotate by controlling the controller 11 of the linear imaging unit 110, generates two-dimensional image data (image data of linear images) by combining a plurality of pieces of one-dimensional image data on lines, which are obtained by the linear sensor 13 performing photoelectric conversion and the A/D converter 14 performing A/D conversion, and stores the two-dimensional image data in the image-data temporary file 106a.

Figure 5:
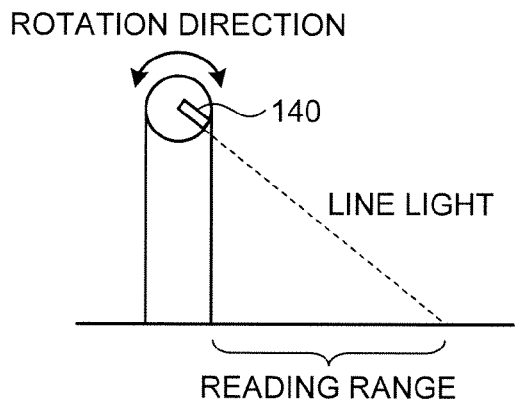
FIG. 5 illustrates a state where the linear imaging unit is viewed from the side thereof and is a diagram illustrating an example of light emitted from a line light source controlled by a light-source control unit.

The light-source control unit 102*f* controls the infrared light source 130 such that it emits light indicating a controllable state of the linear sensor 13 or controls the line light source 140 such that it emits light indicating a reading range of the linear sensor 13. FIG. 5 illustrates a state where the linear imaging unit 110 is viewed from the side thereof and is a diagram illustrating an example of light emitted from the line light source 140 controlled by the light-source control unit 102*f*. As illustrated in FIG. 5, the light-source control unit 102*f* may rotate the line light source 140 in the rotation direction by driving the motor 12 and thus move the line light that is emitted from the line light source 140 and extends in the main-scanning direction in the sub-scanning direction within the reading range, thereby notifying the user of the reading range.

2. Processing in Present Embodiment

An explanation will be given of an example of the processing performed by the overhead scanner 100 having the above configuration with reference to FIG. 6 to FIG. 24.

[2-1. Basic Process]

Figure 6:
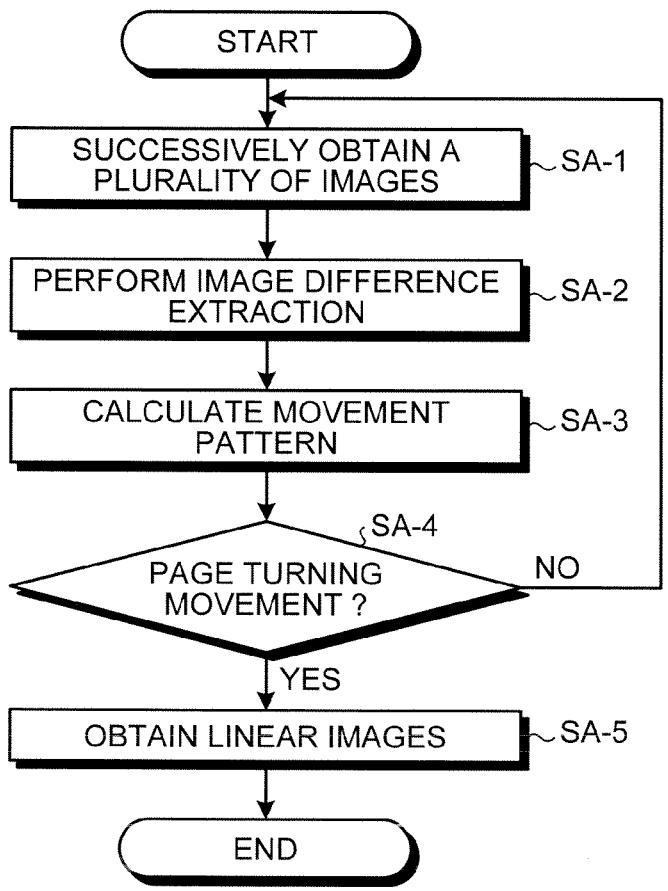
FIG. 6 is a flowchart illustrating an example of the basic process performed by the overhead scanner in the present embodiment.

An explanation will be given of an example of the basic process performed by the overhead scanner 100 in the present embodiment with reference to FIG. 6. FIG. 6 is a flowchart illustrating an example of the basic process performed by the overhead scanner 100 in the present embodiment.

As illustrated in FIG. 6, first, the area-image obtaining unit 102*a* successively obtains a plurality of area images by controlling the area imaging unit 120 (Step SA-1). For example, the area-image obtaining unit 102*a* continuously performs a process of obtaining image data of an area image by the area sensor 22 performing photoelectric conversion and the A/D converter 23 performing A/D conversion by controlling the controller 21 of the area imaging unit 120 and storing the image data in the image-data temporary file 106*a*. The area-image obtaining unit 102*a* may obtain infrared images by infrared irradiation. Accordingly, it is possible to accurately monitor a document page turning movement, the movement of a user's hand, and the like.

Then, the movement-pattern calculating unit 102*b* calculates a movement pattern by image difference extraction by using the images obtained by the area-image obtaining unit 102*a* (Step SA-2). Specifically, the movement-pattern calculating unit 102*b* performs image difference extraction by using the image data of the area images that are stored in the image-data temporary file 106*a* by the area-image obtaining unit 102*a*. For example, the movement-pattern calculating unit 102*b* extracts the gradation difference at each pixel between the last (time t−1) area image, which is obtained and stored in the image-data temporary file 106*a* by the area-image obtaining unit 102*a*, and a newly obtained current (time t) area image. The movement-pattern calculating unit 102*b* may calculate a movement pattern by calculating a gradation difference in units of blocks obtained by dividing an image region into a predetermined number of blocks instead of a gradation difference in units of pixels. When the number of changed pixels in one block is equal to or greater than a predetermined number, the movement-pattern calculating unit 102*b* may evaluate the block as a changed block. Alternatively, when the gradation difference value in one block is equal to or greater than a predetermined value, the movement-pattern calculating unit 102*b* may evaluate the block as a changed block. The movement-pattern calculating unit 102*b* may divide an image region into an arbitrary number of blocks or blocks having an arbitrary shape. For example, the movement-pattern calculating unit 102*b* may divide an image region corresponding to the initial movement of a page turning movement into smaller blocks. It is possible to arbitrarily set the time interval at which two images are obtained for which a difference is calculated.

Then, the movement detecting unit 102*c* detects a page turning movement on the basis of the movement pattern calculated by the movement-pattern calculating unit 102*b* (Step SA-3). For example, when a changed block transitions from left to right, the movement detecting unit 102*c* may detect the movement pattern as a page turning movement. Moreover, when a block corresponding to the initial movement of a page turning movement changes, the movement detecting unit 102*c* may determine that a page turning movement has been performed. The movement detecting unit 102*c* may screen out false-positive patterns other than a page turning movement and exclude the detection. As an example, if a movement pattern corresponds to at least one of (1) a case where a movement is detected in all regions, (2) a case where a specific region did not move, and (3) a case where a movement is detected at a point that does not move during a page turning movement, the movement detecting unit 102*c* may exclude the detection as a false-positive pattern.

When a page turning movement is not detected by the movement detecting unit 102*c* (No in Step SA-4), the read-start determining unit 102*d* returns the process to Step SA-1 and continues to monitor for a document page turning movement, the movement of a user's hand, and the like.

In contrast, when a page turning movement is detected by the movement detecting unit 102*c* (Yes in Step SA-4), the read-start determining unit 102*d* determines that a read operation by the linear sensor 13 be started and the linear-image obtaining unit 102*e* obtains linear images from the linear sensor 13 by controlling the linear imaging unit 110 (Step SA-5). The read-start determining unit 102*d* may determine that a read operation be started on the condition that the movement based on the movement pattern calculated by performing image difference extraction by the movement-pattern calculating unit 102*b* has stopped. In other words, even if it is determined that a page turning movement is being performed, the read-start determining unit 102*d* may be kept on standby for the start of a read operation until the page turning movement ends or the movement of a user's hand stops. When the read-start determining unit 102*d* determines that a read operation be started, the linear-image obtaining unit 102*e* obtains linear images from the linear sensor 13 by controlling the linear imaging unit 110. For example, the linear-image obtaining unit 102*e* drives the motor 12 to rotate by controlling the controller 11 of the linear imaging unit 110, generates two-dimensional image data by combining a plurality of pieces of one-dimensional image data on lines, which are obtained by the linear sensor 13 performing photoelectric conversion and the A/D converter 14 performing A/D conversion, and stores the two-dimensional image data in the image-data temporary file 106*a*. When the above process ends, in order to handle a new page turning movement, the control unit 102 may return the process to Step SA-1, repeat the processes in Step SA-1 to Step SA-4 described above, and continue to monitor document page turning, the movement of a user's hand, and the like.

The above is an example of the basic process performed by the overhead scanner 100 in the present embodiment.

[2-2. Embodying Process]

Next, an explanation will be further given of an example of the embodying process in the basic process described above with reference to FIG. 7 to FIG. 24. The embodying process further includes a false-detection exclusion process, a hand-removal monitoring process, an image correction process, and the like. FIG. 7 is a flowchart illustrating an example of the embodying process performed by the overhead scanner 100 in the present embodiment.

As illustrated in FIG. 7, first, the control unit 102 of the overhead scanner 100 performs a movement-pattern monitoring process by controlling the area imaging unit 120 (Step SB-1). FIG. 8 is a flowchart representing a subroutine of a movement-pattern monitoring process.

As illustrated in FIG. 8, the area-image obtaining unit 102a obtains image data of infrared images by controlling the area imaging unit 120 (Step SC-1).

Then, the movement-pattern calculating unit 102b compares the obtained area image (N) with the image of the last frame (N−1) in order to extract the gradation difference at each pixel (Step SC-2). FIG. 9 is a diagram schematically illustrating a method of comparing the gradation at each pixel of the image of the current frame (N) and the image of the last frame (N−1).

As illustrated in FIG. 9, the movement-pattern calculating unit 102b compares the gradation value of the pixels (for example, A and A' indicated by broken-line rectangles in FIG. 9) at the same coordinates for the image of the current frame (N) and the image of the last frame (N−1). The movement-pattern calculating unit 102b compares the gradation of the target pixel A and that of the target pixel A' of the last frame. If the gradation difference |A-A'| is equal to or larger than a fixed value, the movement-pattern calculating unit 102b determines that the pixel has changed and marks the pixel A. The movement-pattern calculating unit 102b repeatedly performs this process in a similar manner on a pixel B and subsequent pixels, and finally marked portions represent the extracted difference.

Figure 10:
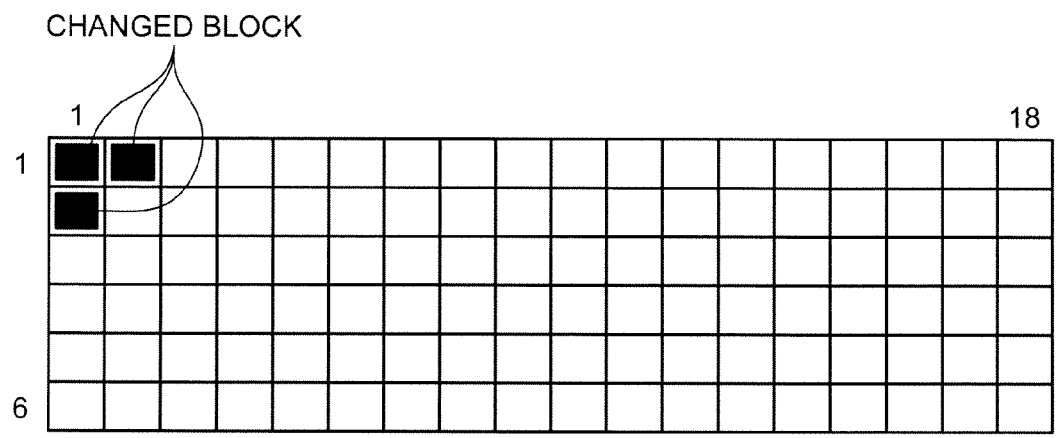
FIG. 10 is a diagram schematically illustrating changed blocks among the blocks (18×6) obtained by dividing an image region horizontally into 18 blocks and vertically into 6 blocks.

Here, the description refers back to FIG. 8. The movement-pattern calculating unit 102b divides the extracted difference image into blocks and extracts changed block images (N') that are changed blocks (Step SC-3). For example, the movement-pattern calculating unit 102b may divide an area image into 1 to 20 blocks both vertically and horizontally and may evaluate how many changed pixels are present in each block. FIG. 10 is a diagram schematically illustrating changed blocks among the blocks (18×6) obtained by dividing an image region horizontally into 18 blocks and vertically into 6 blocks.

Figure 11:
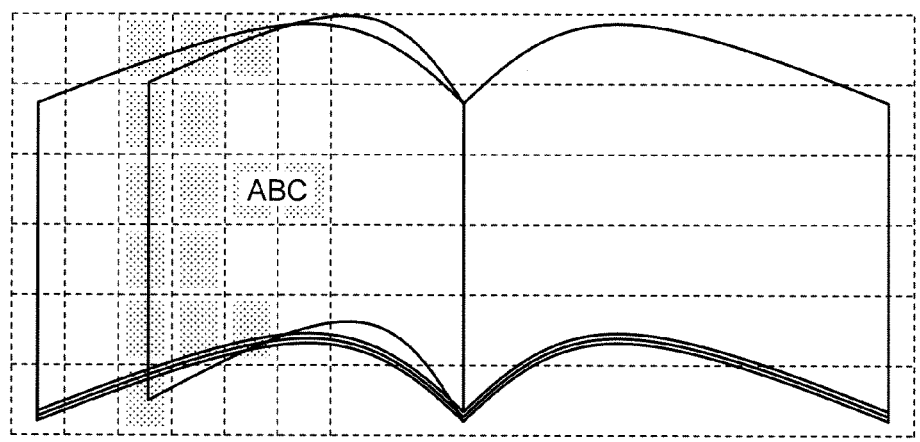
FIG. 11 is a diagram illustrating an example of changed blocks detected when a page turning movement is performed.

As illustrated in FIG. 10, when the number of changed pixels (the number of marked pixels) obtained in Step SC-2 is equal to or greater than a fixed value in a divided block, the movement-pattern calculating unit 102b marks the block as a changed block. In the example in FIG. 10, because the number of changed pixels is equal to or greater than a fixed value in the three upper-left blocks, these blocks are marked (black rectangles) as changed blocks. FIG. 11 is a diagram illustrating an example of changed blocks detected when a page turning movement is performed. In FIG. 11, the changed blocks are marked by hatching.

Figure 12:
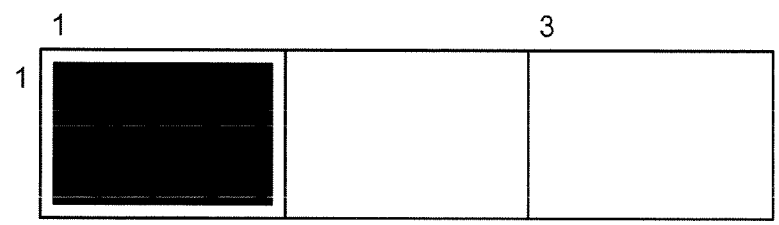
FIG. 12 is a diagram schematically illustrating a changed block among the blocks (3×1) obtained by dividing an image region horizontally into three blocks and vertically into one block.

As illustrated in FIG. 11, when a page turning movement is performed, the edge of the moved page, the characters in the page, and the like appear as a change in the gradation value in the area image; therefore, the movement-pattern calculating unit 102b can detect a block in which the number of changed pixels is equal to or greater than a fixed value as a changed block. Accordingly, the movement of the edge of a page and the movement of the content, such as characters, in a page can be detected as an image difference. The number and shape of divided blocks can be arbitrarily set as described below. FIG. 12 is a diagram schematically illustrating a changed block among the blocks (3×1) obtained by dividing an image region horizontally into three blocks and vertically into one block.

As illustrated in FIG. 12, when the number of changed pixels obtained in Step SC-2 is equal to or greater than a fixed value in a divided block, the movement-pattern calculating unit 102b marks the block as a changed block. In the example in FIG. 12, because the number of changed pixels is equal to or greater than a fixed value in the left block, the block is marked (black rectangle) as a changed block. As an example, when the changed block transitions from the right block to the central block to the left block, the movement detecting unit 102c, which will be described later, may determine that a page turning movement has been performed in a direction from right to left. In a similar manner, when the changed block transitions from the left block to the central block to the right block, the movement detecting unit 102c may determine that a page turning movement has been performed in a direction from left to right. In this manner, when the number of blocks is three, it is possible to detect a pattern of a minimum movement of turning a page of a book. Another example of the number of divided blocks is given in FIG. 13, which is a diagram schematically illustrating changed blocks among the blocks (20×20) obtained by dividing an image region horizontally into 20 blocks and vertically into 20 blocks.

Figure 13:
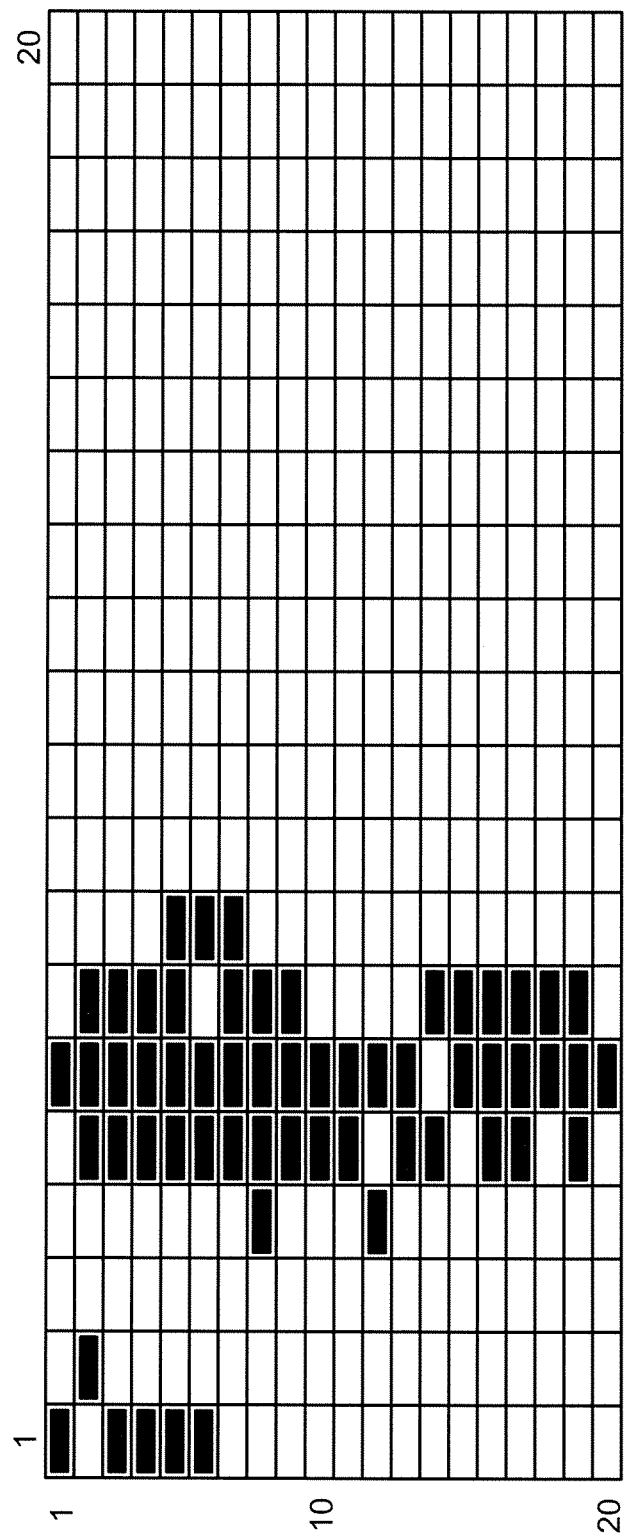
FIG. 13 is a diagram schematically illustrating changed blocks among the blocks (20×20) obtained by dividing an image region horizontally into 20 blocks and vertically into 20 blocks.

As illustrated in FIG. 13, if the number of changed pixels obtained in Step SC-2 is equal to or greater than a fixed value in a divided block, the movement-pattern calculating unit 102b marks the block as a changed block. In the example in FIG. 13, in the block group on the left side relative to the center and the upper-left block group, the number of changed pixels in some blocks is equal to or greater than a fixed value; therefore, the movement-pattern calculating unit 102b marks these block as changed blocks. In this manner, it is possible to evaluate the change of the whole area image region more finely by dividing the area image region into smaller blocks. In other words, it is possible to detect a small change in the gradation of a medium such as a book. Therefore, it is possible to improve the accuracy of excluding false detections by a matching process. In contrast, as illustrated in FIG. 12, if the number of divided blocks is reduced, the processing load decreases; however, only a rough change can be detected, which increases the possibility of a false detection. Thus, the block division method (density of divided blocks and the like) can be determined in accordance with the trade-off between the processing speed and the detection accuracy. If the number of divided blocks is maximized, the number of blocks becomes equal to the number of pixels in an area image. Therefore, in the present embodiment, the explanation of the process in the case where block division is performed can be applied also to the process in the case where block division is not performed.

Figure 14:
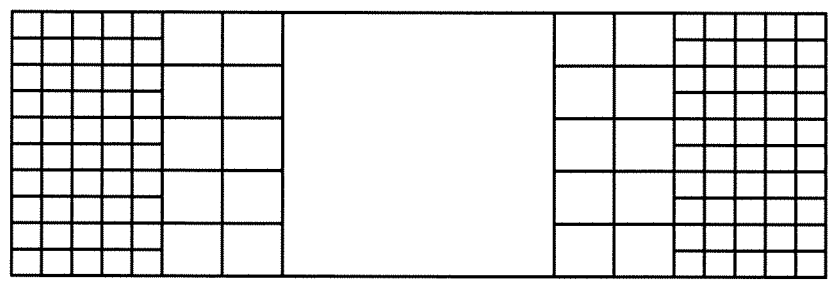
FIG. 14 is a diagram illustrating an example of a division in the case where an image region is divided into smaller blocks in both end portions and into larger blocks in the central portion.

Next, another embodiment of the distribution of the number of divided blocks and the shape of the divided blocks will be described below. FIG. 14 is a diagram illustrating an example of a division in the case where an image region is divided into smaller blocks in both end portions and into larger blocks in the central portion.

Figure 15:
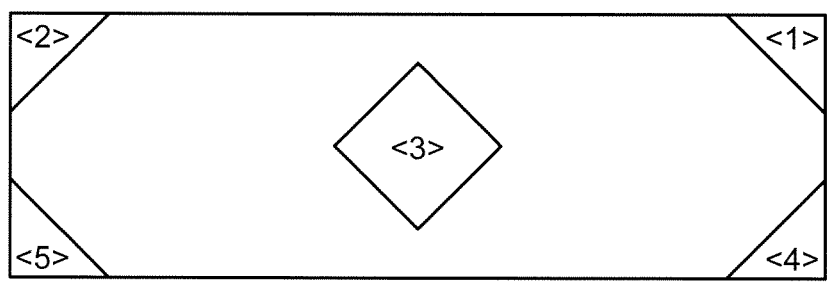
FIG. 15 is a diagram illustrating an example of a division where an image region is divided into blocks such that a movement can be easily monitored at specific points.

As illustrated in FIG. 14, in order to detect more change information on the initial movement of a page turning movement, which tends to represent the characteristics of a page turning movement, such as the movement of holding a page by hand and the movement of the edge of a page, the number of blocks in both end portions in an area image region may be increased by setting the number of divisions to be large in both end portions. In contrast, as in the portion near the center in FIG. 14, the number of divisions is reduced in the central portion in which it is satisfactory to detect only a movement that a page passes over the central portion (i.e., change information does not need to be large); therefore, it is possible to satisfy both the processing speed and the detection accuracy. FIG. 15 is a diagram illustrating an example of a division where an image region is divided into blocks such that a movement can be easily monitored at specific points.

A page turning movement may be detected in the following manner. Specifically, as illustrated in FIG. 15, monitoring points illustrated as <1> to <5> in FIG. 15 are set and the movement-pattern calculating unit 102b detects changed blocks. If the movement detecting unit 102c detects that the changed blocks transition in the order of <1> to <2> to <3> to <4> to <5>, the movement detecting unit 102c may detect the movement pattern as a page turning movement. By setting the monitoring points in such a manner, when a specific hand motion (gesture) is made or a hand moves in an area image region, scanning can be started.

Figure 16:
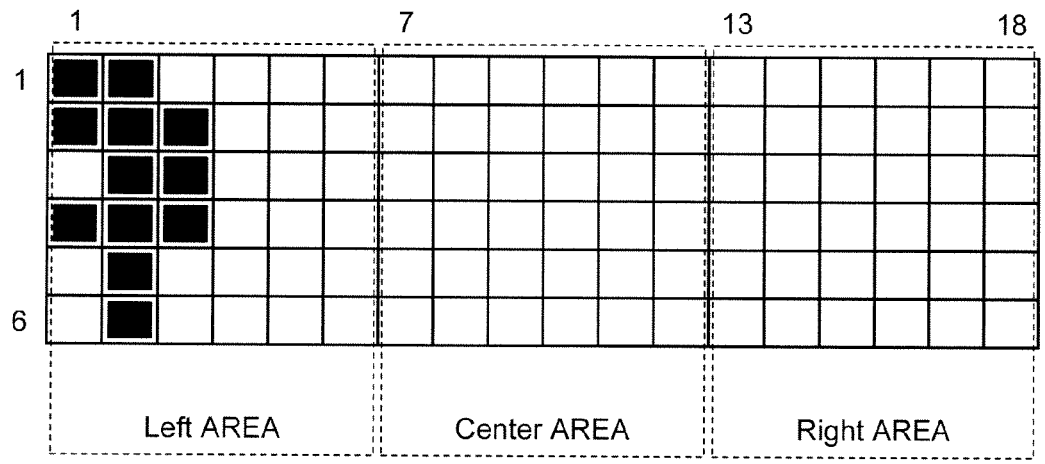
FIG. 16 is a diagram illustrating a determination result of changed blocks in a difference image of the current frame (N)
Figure 17:
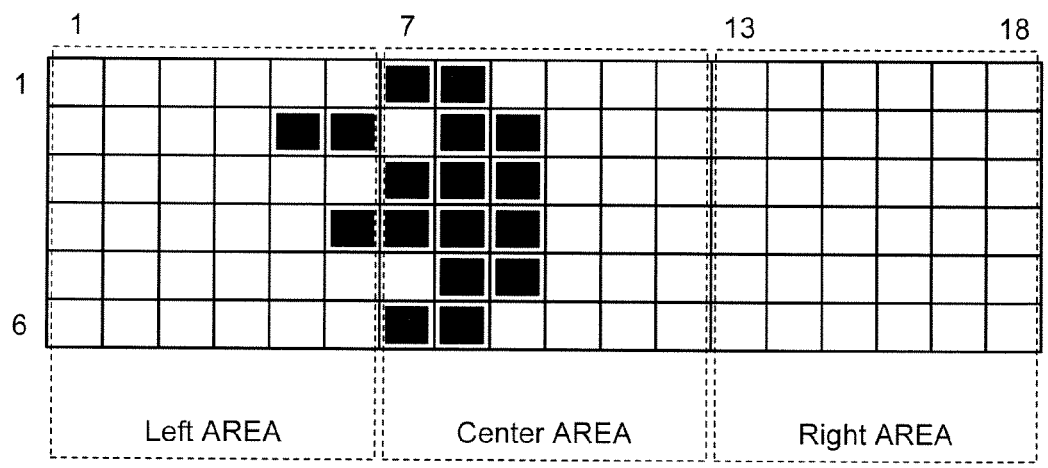
FIG. 17 is a diagram illustrating a determination result of changed blocks in a difference image of the next frame (N+1)
Figure 18:
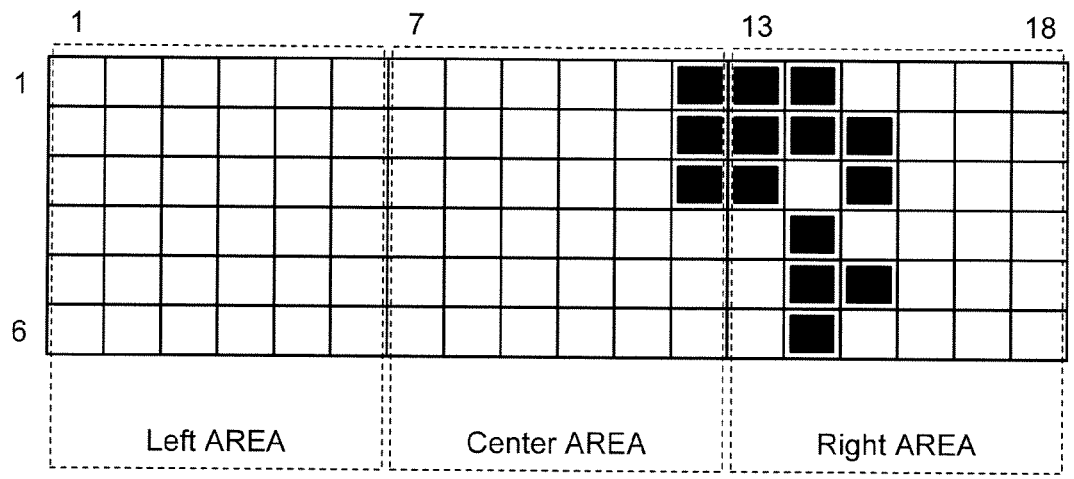
FIG. 18 is a diagram illustrating a determination result of changed blocks in a difference image of the second frame (N+2) after the current frame.

Here, the description refers back to FIG. 8. The movement detecting unit 102c determines whether a page turning movement is performed on the basis of the changed blocks detected in Step SC-3 described above (Step SC-4). More specifically, the movement detecting unit 102c evaluates the transition of the changed blocks between successive frames and determines whether a movement pattern matches a specific movement pattern. An explanation will be given of an example (transition example) of the transition of a movement pattern targeted for detecting a page turning movement with reference to FIG. 16 to FIG. 18. FIG. 16 is a diagram illustrating a determination result of changed blocks in a difference image of the current frame (N). FIG. 17 is a diagram illustrating a determination result of changed blocks in a difference image of the next frame (N+1). FIG. 18 is a diagram illustrating a determination result of changed blocks in a difference image of the second frame (N+2) after the current frame. In the drawings, portions marked by black rectangles represent changed blocks.

As in the example in the drawings, when the Left area, the Center area, and the Right area are set in an image divided into blocks, the movement detecting unit 102c determines whether a movement pattern (that is, a transition pattern of changed blocks) of the successive block images is a specific movement pattern corresponding to a page turning movement. For example, as illustrated in FIG. 16 to FIG. 18, when the changed blocks transition in the order of the Left area to the Center area to the Right area, the movement detecting unit 102c may determine that a page turning movement is performed in a direction from left to right. Although not illustrated, in a similar manner, when the changed blocks transition in the order of the Right area to the Center area to the Left area, the movement detecting unit 102c may determine that a page turning movement is performed in a direction from right to left. By performing this movement detecting process, it is possible to detect the flow of a series of movements. The series of movements includes "(1) holding a page (detection of the movement of the edge), (2) turning a page (detection of the movement of passing over the center of an image), and (3) releasing a page (detection of the movement of the opposite edge)", which are the most common characteristics of a page turning movement.

Here, the description refers back to FIG. 8. When the movement detecting unit 102c does not determine that a page turning movement has been performed (No in Step SC-4), the movement detecting unit 102c returns the process to Step SC-1 and repeats the processes in Steps SC-1 to SC-4 described above.

In contrast, when the movement detecting unit 102c detects a page turning movement (Yes in Step SC-4), if the condition to stop the start of a read operation is not satisfied, the read-start determining unit 102d determines that a read operation be started and the linear-image obtaining unit 102e obtains linear images (Step SC-5).

Even if the movement detecting unit 102c determines that a movement pattern is a specific movement pattern corresponding to a page turning movement, it is possible that a different movement may be accidentally determined as a movement that is the same as a page turning movement. Therefore, in order to screen out false-positive patterns other than a page turning movement and exclude the detection, the movement detecting unit 102c may additionally perform a matching process (Step SB-2 in FIG. 7) of matching a movement pattern with false-positive patterns.

Figure 19:
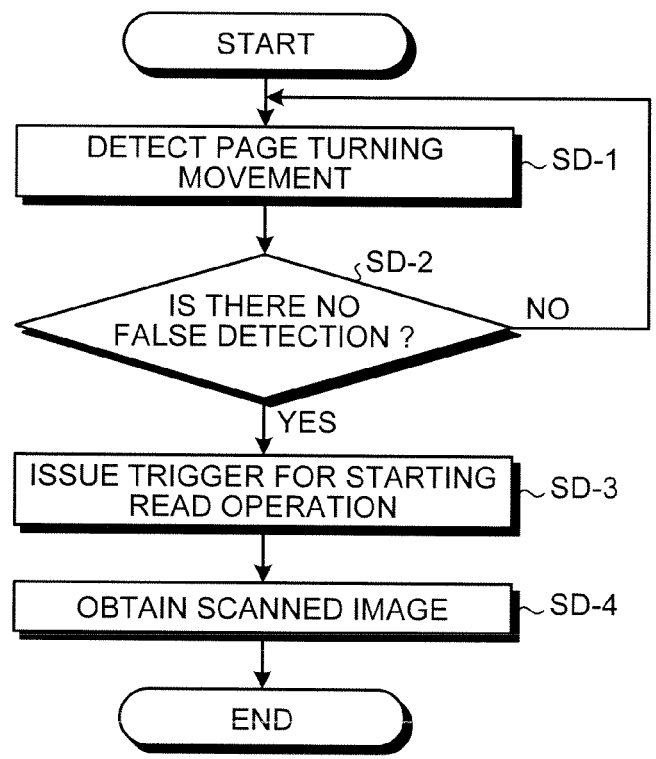
FIG. 19 is a flowchart representing a subroutine of a false-detection exclusion process.

Specifically, the movement detecting unit 102c evaluates whether a specific false-positive pattern targeted for exclusion is detected before and after detection of a pattern corresponding to a page turning movement. When the movement detecting unit 102c determines that a false-positive pattern is detected, the movement detecting unit 102c excludes the detection so that a trigger for starting a read operation is not issued. FIG. 19 is a flowchart representing a subroutine of a false-detection exclusion process.

As illustrated in FIG. 19, when the movement detecting unit 102c detects a page turning movement (Step SD-1), the movement detecting unit 102c determines whether there is a specific pattern corresponding to a false-positive pattern over m frames (N-m to N+m) before and after the current frame (N) and the next frame (N+1) in which a page turning movement is detected (Step SD-2). Then, when the movement detecting unit 102c detects a false-positive pattern (No in Step SD-2), the movement detecting unit 102c returns the process to Step SD-1 and monitors for a new page turning movement. In contrast, when the movement detecting unit 102c determines that movement patterns are not a false-positive pattern (Yes in Step SD-2), the read-start determining unit 102d issues a trigger for starting a read operation (Step SD-3) and the linear-image obtaining unit 102e obtains a scanned image (Step SD-4).

Figure 20:
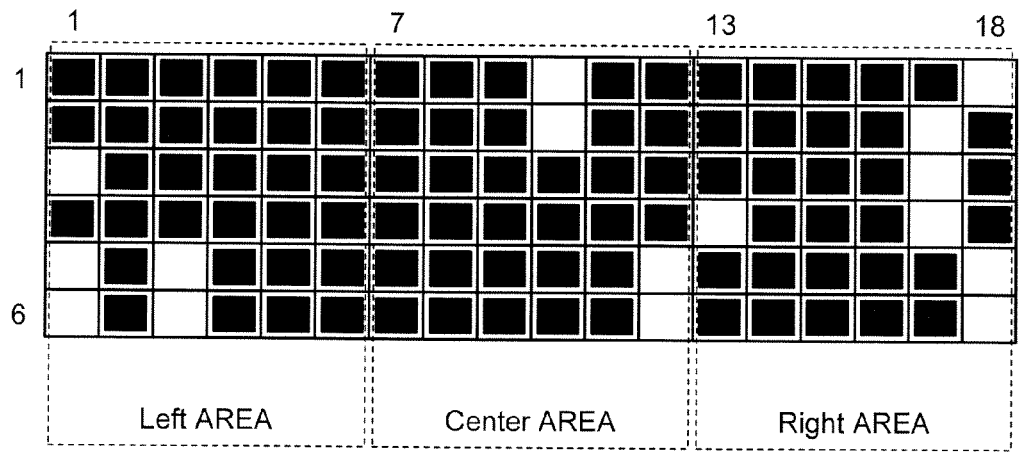
FIG. 20 is a diagram illustrating an example of a detection of changed blocks in (1) a case where a movement is detected in all regions.

As an example of a false detection, if a movement pattern corresponds to at least one of (1) a case where a movement is detected in all regions, (2) a case where a specific region did not move, and (3) a case where a movement is detected at a point that does not move during a page turning movement, the movement detecting unit 102c may exclude the detection as a false-positive pattern. FIG. 20 is a diagram illustrating an example of a detection of changed blocks in (1) a case where a movement is detected in all regions.

Figure 21:
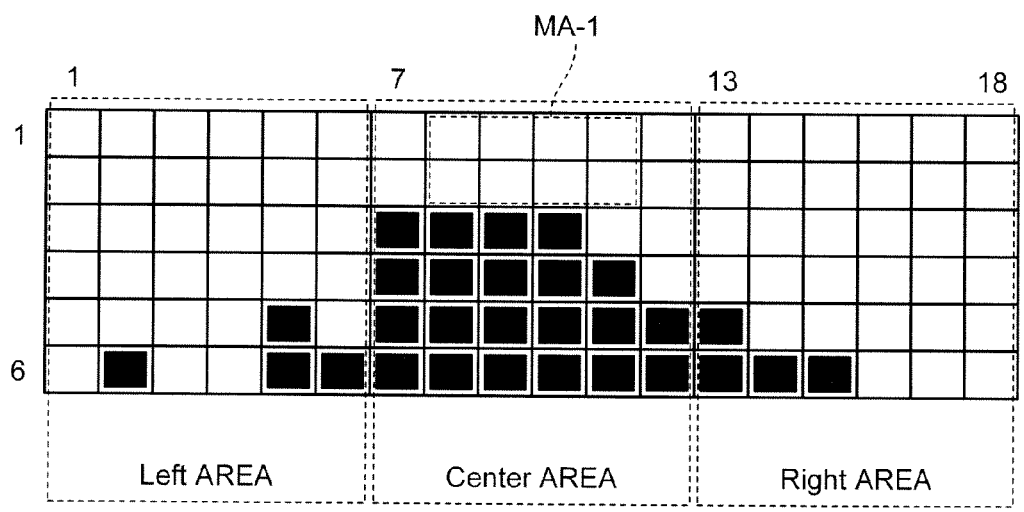
FIG. 21 is a diagram illustrating an example of the detection of changed blocks in (2) a case where a specific region did not move.

As illustrated in FIG. 20, when a movement is detected in all regions at the same time, it is considered that the whole book is moved in the detection range of the area sensor. Thus, when changed blocks are detected in all of the Left area, the Center area, and the Right area, the movement detecting unit 102c detects it as a false-positive pattern and excludes the detection so that a read operation is not started. FIG. 21 is a diagram illustrating an example of the detection of changed blocks in (2) a case where a specific region did not move.

Figure 22:
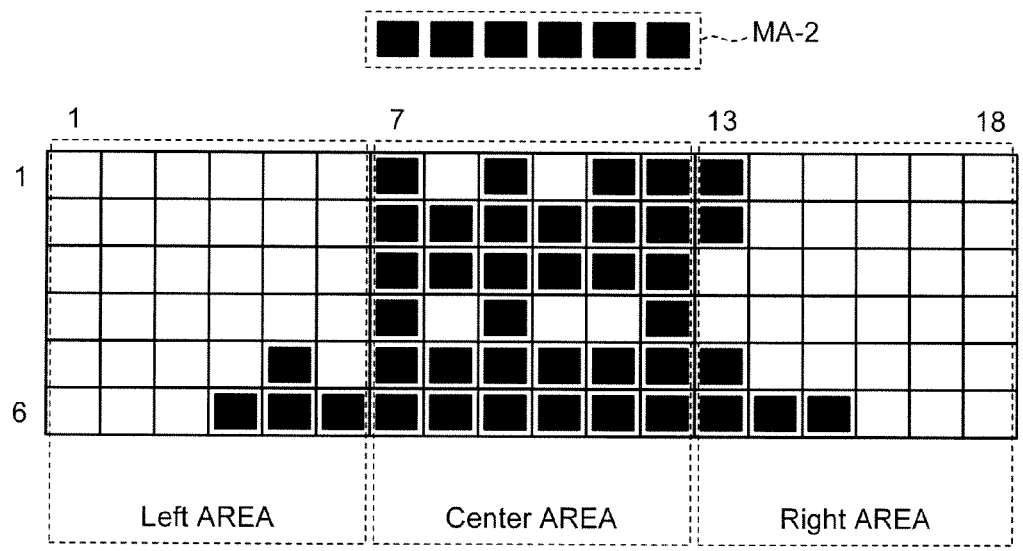
FIG. 22 is a diagram illustrating an example of the detection of changed blocks in (3) a case where a movement is detected at a point that does not move during a page turning movement.

When a page of a book is turned, the page passes over the central region of the book and therefore the central region moves by necessity. However, when a specific region that is to move in a page turning movement does not move, it is considered that the page was not turned but a hand or the like moved. Accordingly, as illustrated in FIG. 21, when only part of the Center area moves and the specific region MA-1 does not move, the movement detecting unit 102c determines that the movement pattern is a false-positive pattern and excludes the detection. FIG. 22 is a diagram illustrating an example of the detection of changed blocks in (3) a case where a movement is detected at a point that does not move during a page turning movement.

As illustrated in FIG. 22, when only a page of a book is turned, a movement is not normally detected in the region MA-2 because the region MA-2 is away from the region in which the book is placed. In this case, it is considered that a page was not turned but a hand or the like moved. Therefore, it is highly likely that a region that is not related to the movement of the target medium moves and the movement is falsely detected. Thus, a read operation is not started. When the specific region MA-2 moves, the movement detecting unit 102c determines that the movement pattern is a false-positive pattern and excludes the detection. Movements may be classified by creating such a specific point.

Figure 23:
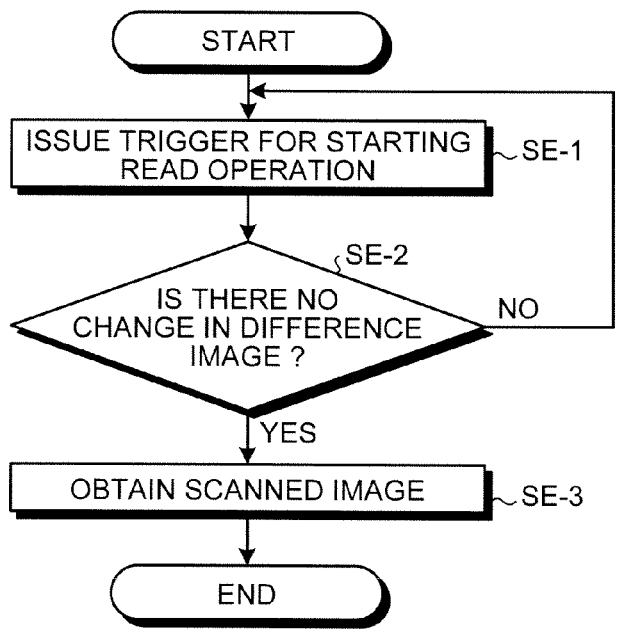
FIG. 23 is a flowchart representing a subroutine of a hand-removal monitoring process.

Here, the description refers back to FIG. 7. After the overhead scanner 100 performs a detection process SB-1 of detecting a page turning movement and a false-detection exclusion process SB-2, the overhead scanner 100 may perform a hand-removal monitoring process SB-3 before performing a scanned-image obtaining process SB-4. In other words, the read-start determining unit 102d may determine that a read operation be started on the condition that the movement based on the movement pattern calculated by image difference extraction has stopped. FIG. 23 is a flowchart representing a subroutine of a hand-removal monitoring process.

Figure 24:
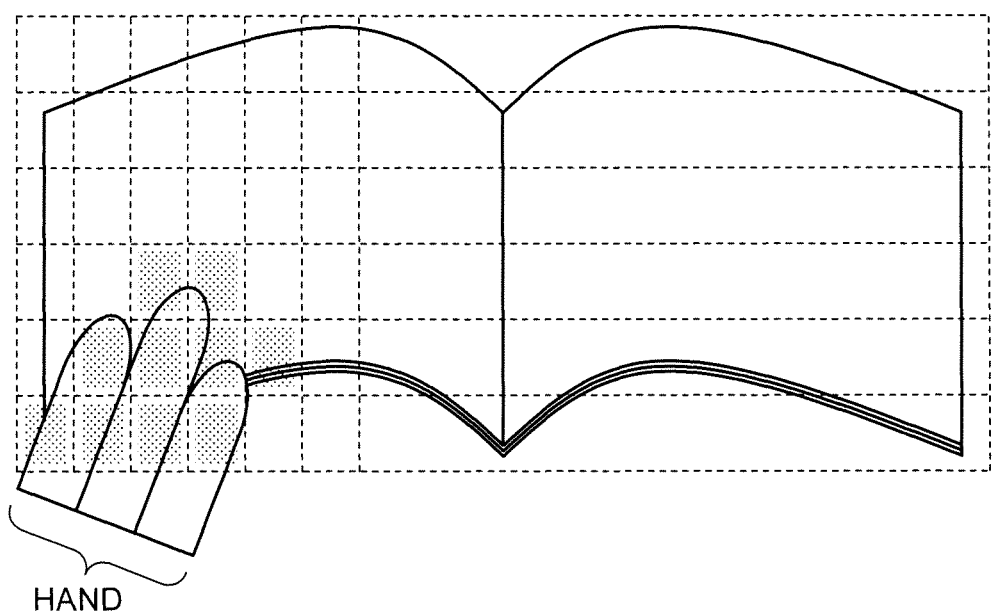
FIG. 24 is a diagram schematically illustrating an example of an extracted image when a hand remains in place.

As illustrated in FIG. 23, when the detection of a page turning movement described above is not excluded as a false detection and a trigger for starting a read operation is issued (Step SE-1), the read-start determining unit 102d determines whether there is a change in the difference image between the image of the current frame (N) and the image of the last frame (N−1) calculated by the movement-pattern calculating unit 102b (Step SE-2). When there is a change in the difference image (No in Step SE-2), the read-start determining unit 102d returns the process to Step SE-1 and stops the start of a read operation. In contrast, when there is no change in the difference image (Yes in Step SE-2), the read-start determining unit 102d determines that a read operation be started and the linear-image obtaining unit 102e obtains a scanned image (Step SE-3). FIG. 24 is a diagram schematically illustrating an example of an extracted image when a hand remains in place.

It is preferable not to start a read operation until the movement of removing a hand from the region is completed or the movement of pressing a page of a book and holding the page in place is completed after the page of the book is turned. Therefore, as illustrated in FIG. 24, while a changed block continues to be detected, the read-start determining unit 102d stops the read start process and waits for the start of a read operation. Then, after a predetermined number of seconds from when it is recognized that there is no change in the image due to the movement of removing a hand or holding a page of a book, the read-start determining unit 102d may determine that a read operation be started.

Here, the description refers back to FIG. 7. The linear-image obtaining unit 102e obtains image data of linear images from the linear sensor 13 by controlling the linear imaging unit 110 in accordance with the trigger for starting a read operation issued by the read-start determining unit 102d (Step SB-4).

Then, the control unit 102 of the overhead scanner 100 performs an image correction process (Step SB-5). For example, the control unit 102 may divide the linear images obtained by the linear-image obtaining unit 102e along a page boundary and correct the images so that warpage of paper of the opened page is eliminated. Moreover, the control unit 102 may detect a skin-color portion region from an image using a known pattern recognition algorithm or the like and correct it to white or the like on the basis of the color (skin color) of a user's hand stored in the indicator file 106c.

Then, the control unit 102 of the overhead scanner 100 stores image data of the corrected image in the processed-image data file 106b (Step SB-6) and ends the process.

The above is an example of the embodying process performed by the overhead scanner 100 in the present embodiment. In the embodying process described above, an explanation is given of the flow of a single process in a case where images in a horizontal double-page spread are read; however, it is possible to automatically continue to read other double-page spreads by repeating the processes in Step SB-1 to Step SB-5 described above.

3. Summary of Present Embodiment and Other Embodiments

As described above, according to the present embodiment, the overhead scanner 100 successively obtains area images by controlling the area imaging unit 120, calculates a movement pattern by image difference extraction by using the area images, and detects a page turning movement on the basis of the calculated movement pattern. When a page turning movement is detected, the overhead scanner 100 determines that a read operation by the linear sensor 13 be started. Consequently, it is possible to prevent a false detection and detect the start of a read operation with high accuracy.

More specifically, with a conventional method of determining a page turning movement on the basis of velocity vectors of feature points, vectors can be detected only near the central portion where the amount of movement of feature points is large and a fine classification process cannot be performed. According to the present embodiment, even when the movement of a feature point that moves slowly cannot be recognized as a relevant velocity vector, the slow movement can be detected by image difference extraction.

Moreover, when an extremely white medium is placed in the area sensor range, the feature points become weak and, when a small medium, such as A6 paper, is placed, the number of feature points decreases. Therefore, conventionally, velocity vectors are difficult to calculate on the basis of the feature points and thus detection is not accurately performed. According to the present embodiment, for example, even when the feature points are weak due to a white medium or even when the number of feature points is small due to a small medium, it is possible to detect the movement of shadows and fine movement, which are not conventionally detected, by extracting a difference in an image. Thus, the movement of an object can be detected without depending on the medium.

Moreover, if the edge of the medium is not clear, conventionally, the feature points are not successfully detected. Accordingly, an area sensor is required to have a certain level of resolution; therefore, an expensive and highly accurate sensor needs to be used. According to the present embodiment, even if the resolution of an area sensor is reduced, a movement can be detected as long as a difference in an image can be obtained. Thus, the apparatus can be configured with a less expensive sensor.

Moreover, in an example of a conventional technology, the movement and position with and at which a large velocity vector is obtained are limited; therefore, there is a limit in narrowing down the movement-detection determination condition and reducing false detections. For example, vectors with which a page turning movement can be detected are often limited to large vectors obtained when the position of a page is 60° to 120° with respect to the horizontal plane. According to the present embodiment, because the initial and final movements during page turning are definitely detected due to the certain amount of difference in an image in the end portions of the screen, even when the position of a page is not 60° to 120° with respect to the horizontal plane, a page turning movement can be accurately detected.

Moreover, in an example of a conventional technology in which a projection pattern is projected, the projection pattern becomes uneven from the beginning in a region other than a flat surface; therefore, the operation cannot be performed successfully in some cases. However, according to the present embodiment, the operation can be performed successfully irrespective of the unevenness of the detection region. Moreover, it is possible to detect a special pattern, such as the movement of a hand and the movement of a book, in a region that cannot be detected on the basis of only the transition of the movement of a reflected projection pattern. Moreover, even if a medium is thin or a region to be detected is not flat, a page turning movement can be detected by detecting the transition of the movement of a page.

Moreover, according to the present embodiment, the overhead scanner 100 obtains an infrared image by infrared irradiation by using the area-image obtaining unit 102a. In the present embodiment, infrared rays are emitted to a detection region. This is different from an example of a conventional technology in which a projection pattern is used. Therefore, the transition of the movement in the region and the movement of an object can be clearly detected.

Moreover, according to the present embodiment, the overhead scanner 100 screens out false-positive patterns other than a page turning movement and excludes the detection by using the movement detecting unit 102c. Therefore, even when the movement pattern accidentally corresponding to a page turning movement is detected, a falsely detected movement pattern is excluded. Accordingly, the determination process of a page turning movement can be improved.

Moreover, according to the present embodiment, the overhead scanner 100 determines that a read operation be started by the read-start determining unit 102d on the condition that the movement based on the movement pattern calculated by image difference extraction has stopped. Therefore, when a page is moving or a hand is moving, a read operation is kept on standby. Accordingly, a clear image of a stationary object can be obtained.

Moreover, according to the present embodiment, the overhead scanner 100 divides an image region into a predetermined number of blocks and calculates a movement pattern by using the movement-pattern calculating unit 102b; therefore, the overhead scanner 100 determines a change for each block and thus the processing speed can be improved.

Moreover, according to the present embodiment, the overhead scanner 100 divides an image region into an arbitrary number of blocks and, when the number of changed pixels in one block is equal to or greater than a predetermined value, evaluates the block as a changed block, by using the movement-pattern calculating unit 102b. Therefore, the processing on the basis of the number of changed pixels can be speeded up.

Moreover, according to the present embodiment, the overhead scanner 100 divides an image region corresponding to the initial motion of a page turning movement into smaller blocks by using the movement-pattern calculating unit 102b. Accordingly, it is possible to detect more change information on the initial movement of a page turning movement, which tends to represent the characteristics of a page turning movement, such as the movement of holding a page by the hand and the movement of the edge of a page, by setting the number of divisions to be large in both end portions of the page.

Moreover, according to the present embodiment, in the overhead scanner 100, if a movement pattern corresponds to at least one of (1) a case where a movement is detected in all regions, (2) a case where a specific region did not move, and (3) a case where a movement is detected at a point that does not move during a page turning movement, the movement detecting unit 102c may exclude the detection as a false-positive pattern. Accordingly, (1) if a movement is detected at the same time in all the regions of an area sensor, it is considered that environmental light may change or a medium itself may be moved, which is different from the movement pattern of a page turning movement; therefore, a false detection can be excluded. Moreover, (2) if a movement is not detected in a region that actually needs to move during a page turning movement, this is simply considered as the movement of a hand or the like that is not accompanied with a page turning movement. Therefore, a false detection can be excluded. Moreover, (3) when a button is pressed, a movement is detected in a specific area different from an area in the case of a page turning movement; therefore, even if a movement pattern closely resembling a page turning movement is detected before and after the page turning movement, a false detection can be excluded.

Furthermore, the present invention may be implemented by various different embodiments within the scope of the technical idea described in the claims in addition to the above-described embodiments. For example, the infrared light source 130 may output light in a wavelength region other than the infrared region, and the area sensor 22 may detect light in a wavelength region other than the infrared region. Moreover, an explanation is given of the case where the overhead scanner 100 performs the processing in stand-alone mode as an example; however, the overhead scanner 100 may perform the processing in response to a request from a client terminal in a cabinet different from the overhead scanner 100 and return the processing results to the client terminal. Moreover, among the processings described in the embodiments, all or part of the processings described as automatic processing may be performed manually or all or part of the processings described as manual processing may be performed automatically by well-known methods. In addition thereto, the processing procedures, the control procedures, the specific names, the information including registered data of each processing, the screen examples, and the database configurations, described in the literatures and drawings above may be arbitrarily modified unless otherwise indicated.

Furthermore, each component of the overhead scanner 100 illustrated in the drawings is formed on the basis of functional concept, and is not necessarily configured physically the same as those illustrated in the drawings. For example, all or any part of the processing functions that the devices in the overhead scanner 100 have, and particularly each processing function performed by the control unit 102, may be implemented by a CPU (Central Processing Unit) and a program interpreted and executed by the CPU, or may be implemented as hardware by wired logic. The program is recorded in a recording medium, which will be described later, and is mechanically read by the overhead scanner 100 as necessary. Specifically, the storage unit 106, such as a ROM and an HDD, or the like records a computer program for executing various processings. This computer program is executed by being loaded into a RAM and configures the control unit in cooperation with the CPU. Moreover, this computer program may be stored in an application program server that is connected to the overhead scanner 100 via an arbitrary network, and all or part thereof may be downloaded as necessary.

Furthermore, the program according to the present invention may be stored in a computer-readable recording medium or may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blue-ray Disc. Moreover, the "program" refers to a data processing method written in any language and any description method and is not limited to a specific format, such as source codes and binary codes. The "program" is not necessarily configured unitarily and includes a program constituted in a dispersed manner as a plurality of modules and libraries and a program that implements its functions in cooperation with a different program representative of which is an OS (Operating System). Well-known configurations and procedures can be used for the specific configuration and reading procedure for reading a recording medium, the installation procedure after reading a recording medium, and the like in each device illustrated in the present embodiment.

Various databases and the like (the image-data temporary file 106a, the processed-image data file 106b, and the indicator file 106c) stored in the storage unit 106 are a storage unit, examples of which is a memory device, such as a RAM and a ROM, a fixed disk drive, such as a hard disk, a flexible disk, and an optical disk, and stores various programs, tables, databases, and the like that are used for various processings.

Moreover, the overhead scanner 100 may be configured as an information processing apparatus, such as well-known personal computer and workstation, or may be configured by connecting an arbitrary peripheral device to the information processing apparatus. Moreover, the overhead scanner 100 may be realized by installing software (including program, data, and the like) that causes the information processing apparatus to realize the method in the present invention. A specific form of distribution/integration of the devices is not limited to those illustrated in the drawings and it can be configured such that all or part thereof is functionally or physically distributed or integrated, by arbitrary units, depending on various additions or the like or depending on functional load. In other words, the above-described embodiments may be performed by arbitrarily combining them with each other or the embodiments may be selectively performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An overhead scanner comprising:
   an area sensor; and
   a control unit, wherein
   the control unit includes:
   an area-image obtaining unit that successively obtains a plurality of images by controlling the area sensor,
   a movement-pattern calculating unit that calculates a movement pattern by image difference extraction which is to extract a difference between gradation values of pixels at the same coordinates by using the images obtained by the area-image obtaining unit,
   a movement detecting unit that detects a page turning movement on a basis of the movement pattern calculated by the movement-pattern calculating unit, and
   a read-start determining unit that determines that a read operation be started when the page turning movement is detected by the movement detecting unit.

2. The overhead scanner according to claim 1, wherein the area-image obtaining unit obtains an infrared image by infrared irradiation.

3. The overhead scanner according to claim 1, wherein the movement detecting unit screens out a false-positive pattern other than the page turning movement and excludes a detection of the false-positive pattern.

4. The overhead scanner according to claim 1, wherein the read-start determining unit determines that a read operation be started on a condition that a movement on a basis of the movement pattern calculated by the image difference extraction has stopped.

5. The overhead scanner according to claim 1, wherein the movement-pattern calculating unit divides an image region into a predetermined number of blocks and calculates the movement pattern.

6. The overhead scanner according to claim 5, wherein the movement-pattern calculating unit divides an image region into an arbitrary number of blocks and, when number of changed pixels in one block is equal to or greater than a predetermined value, evaluates the block as a changed block.

7. The overhead scanner according to claim 5, wherein the movement-pattern calculating unit divides an image region corresponding to an initial movement of the page turning movement into smaller blocks.

8. The overhead scanner according to claim 3, wherein when a movement pattern corresponds to at least any one of a case where a movement is detected in all regions, a case where a specific region did not move, and a case where a movement is detected at a point that does not move during page turning, the movement detecting unit excludes a detection as the false-positive pattern.

9. An image obtaining method comprising:
   an area-image obtaining step of successively obtaining a plurality of images by controlling an area sensor;
   a movement-pattern calculating step of calculating a movement pattern by image difference extraction which is to extract a difference between gradation values of pixels at the same coordinates by using the images obtained in the area-image obtaining step;
   a movement detecting step of detecting a page turning movement on a basis of the movement pattern calculated in the movement-pattern calculating step; and
   a read-start determining step of determining that a read operation be started when the page turning movement is detected in the movement detecting step, wherein the area-image obtaining step, the movement-pattern calculating step, the movement detecting step, and the read-start determining step are executed by a control unit of an overhead scanner that includes the area sensor and the control unit.

10. A non-transitory computer-readable recording medium that stores therein a program that causes a control unit of an overhead scanner including an area sensor and the control unit to execute:
    an area-image obtaining step of successively obtaining a plurality of images by controlling the area sensor;
    a movement-pattern calculating step of calculating a movement pattern by image difference extraction which is to extract a difference between gradation values of pixels at the same coordinates by using the images obtained in the area-image obtaining step;

a movement detecting step of detecting a page turning movement on a basis of the movement pattern calculated in the movement-pattern calculating step; and a read-start determining step of determining that a read operation be started when the page turning movement is detected in the movement detecting step.

11. The image obtaining method according to claim 9, wherein in the movement-pattern calculating step, an image region is divided into a predetermined number of blocks and calculates the movement pattern.

12. The image obtaining method according to claim 11, wherein in the movement-pattern calculating step, an image region is divided into an arbitrary number of blocks and, when number of changed pixels in one block is equal to or greater than a predetermined value, the block is evaluated as a changed block.

13. The image obtaining method according to claim 11, wherein in the movement-pattern calculating step, an image region is divided corresponding to an initial movement of the page turning movement into smaller blocks.

14. The image obtaining method according to claim 9, wherein in the movement detecting unit, a false-positive pattern other than the page turning movement is screened out and a detection of the false-positive pattern is excluded.

15. The image obtaining method according to claim 14, wherein when a movement pattern corresponds to at least any one of a case where a movement is detected in all regions, a case where a specific region did not move, and a case where a movement is detected at a point that does not move during page turning, a detection is excluded as the false-positive pattern in the movement detecting step.

16. The non-transitory computer-readable recording medium according to claim 10, wherein in the movement-pattern calculating step, an image region is divided into a predetermined number of blocks and calculates the movement pattern.

17. The non-transitory computer-readable recording medium according to claim 16, wherein in the movement-pattern calculating step, an image region is divided into an arbitrary number of blocks and, when number of changed pixels in one block is equal to or greater than a predetermined value, the block is evaluated as a changed block.

18. The non-transitory computer-readable recording medium according to claim 16, wherein in the movement-pattern calculating step, an image region is divided corresponding to an initial movement of the page turning movement into smaller blocks.

19. The non-transitory computer-readable recording medium according to claim 10, wherein in the movement detecting unit, a false-positive pattern other than the page turning movement is screened out and a detection of the false-positive pattern is excluded.

20. The non-transitory computer-readable recording medium according to claim 19, wherein when a movement pattern corresponds to at least any one of a case where a movement is detected in all regions, a case where a specific region did not move, and a case where a movement is detected at a point that does not move during page turning, a detection is excluded as the false-positive pattern in the movement detecting step.

* * * * *